United States Patent
Hoareau et al.

(10) Patent No.: US 9,654,240 B1
(45) Date of Patent: May 16, 2017

(54) SITUATION-BASED BROADCAST MESSAGES

(71) Applicant: International Business Machines Corporation, Armonk, NY (US)

(72) Inventors: Guillaume Hoareau, Montpellier (FR); Johannes J. Liebenberg, South Africa (ZA); John G. Musial, Newburgh, NY (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/986,948

(22) Filed: Jan. 4, 2016

(51) Int. Cl.
| | |
|---|---|
| *G06Q 30/02* | (2012.01) |
| *H04H 60/70* | (2008.01) |
| *H04W 64/00* | (2009.01) |
| *H04W 80/04* | (2009.01) |
| *H04W 88/02* | (2009.01) |

(52) U.S. Cl.
CPC ......... *H04H 60/70* (2013.01); *G06Q 30/0252* (2013.01); *G06Q 30/0261* (2013.01); *H04W 64/006* (2013.01); *H04W 80/04* (2013.01); *H04W 88/02* (2013.01)

(58) Field of Classification Search
CPC ............ G06F 17/3087; G06C 30/0252; G06C 30/0261
See application file for complete search history.

(56) References Cited

U.S. PATENT DOCUMENTS

| | | | |
|---|---|---|---|
| 8,320,873 B2 | 11/2012 | Sennett et al. | |
| 8,478,229 B2 | 7/2013 | Velusamy et al. | |
| 8,948,721 B2 | 2/2015 | Sennett et al. | |
| 9,530,108 B2* | 12/2016 | Thomas | ............... G06Q 10/02 |
| 2002/0083035 A1* | 6/2002 | Pearl | ................. G06F 17/30861 |
| 2003/0208595 A1* | 11/2003 | Gouge | .................... H04L 67/16 709/225 |
| 2003/0233278 A1* | 12/2003 | Marshall | ................ G06Q 30/00 705/14.35 |
| 2010/0131530 A1* | 5/2010 | Gibson | ............... G06F 17/3087 707/758 |
| 2012/0013451 A1 | 1/2012 | Casey et al. | |
| 2012/0203602 A1* | 8/2012 | Walters | .............. G06Q 30/0241 705/14.5 |

(Continued)

OTHER PUBLICATIONS

Anomously Disclosed, "Sybase 365 Partners With New York State Emergency Management Office to Deliver SMS Emergency Alerts", Business Wire, 2009; 7 pages.

*Primary Examiner* — Asghar Bilgrami
(74) *Attorney, Agent, or Firm* — Cantor Colburn LLP (57) ABSTRACT

An aspect includes receiving, by a computer processor, a sign up request from a mobile device for a message service. The message service is configured to distribute messages spanning a time period that corresponds to an event at which the mobile device is present. A further aspect includes determining, during the course of the time period, an occurrence of a condition for triggering a first message and sending the first message to the mobile device during the time period using a wireless internet browser based protocol. The first message is transmitted over a wireless network. A further aspect includes cancelling the message service at the expiration of the time period.

20 Claims, 7 Drawing Sheets

(56) References Cited

U.S. PATENT DOCUMENTS

2014/0378082 A1 12/2014 Ros et al.
2015/0072639 A1 3/2015 Zhang et al.
2015/0081817 A1 3/2015 Jeon et al.

* cited by examiner

SITUATION-BASED BROADCAST MESSAGES

BACKGROUND

The invention relates generally to messaging services, and more specifically, situation-based broadcast messages that are limited by time or an event.

SUMMARY

According to an embodiment, a method is provided. The method includes receiving, by a computer processor, a sign up request from a mobile device for a message service. The message service is configured to distribute messages spanning a time period that corresponds to an event at which the mobile device is present. The method also includes determining, during the course of the time period, an occurrence of a condition for triggering a first message, and sending the first message to the mobile device during the time period using a wireless internet browser based protocol. The first message is transmitted over a wireless network. The method further includes cancelling the message service at the expiration of the time period.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide situation-based broadcast messages under a subscription. In an embodiment, situation-based broadcast message services (also referred to herein as "message services") are directed to providing real-time notifications to subscribing devices that are present at a venue or location. In an embodiment, the message services provide the notifications to alert the subscribers of any unsafe conditions or emergency that may arise. An entity implementing the message services provides a wireless network to potential subscribers whereby the network appears on their mobile devices as an available wireless network when the devices are within wireless signal range of the location. A potential subscriber can then access the wireless network, and once the browser is opened on the device, the potential subscriber is directed to a web page of the entity that accepts subscriptions to the message services in order to receive messages of any relevant conditions detected at the event or location. These messages can be sent via the web to various mobile device platforms, e.g., Google Cloud Message, Apple Push Notification Service, and Windows Push Notification Service, via the mobile device's browser or browser extension. Once enabled for the messages, the browser or browser extension does not need to be currently running in the foreground of the mobile device to receive the notifications. As used herein, the terms "message" and "notification" are used interchangeably.

Figure 1:
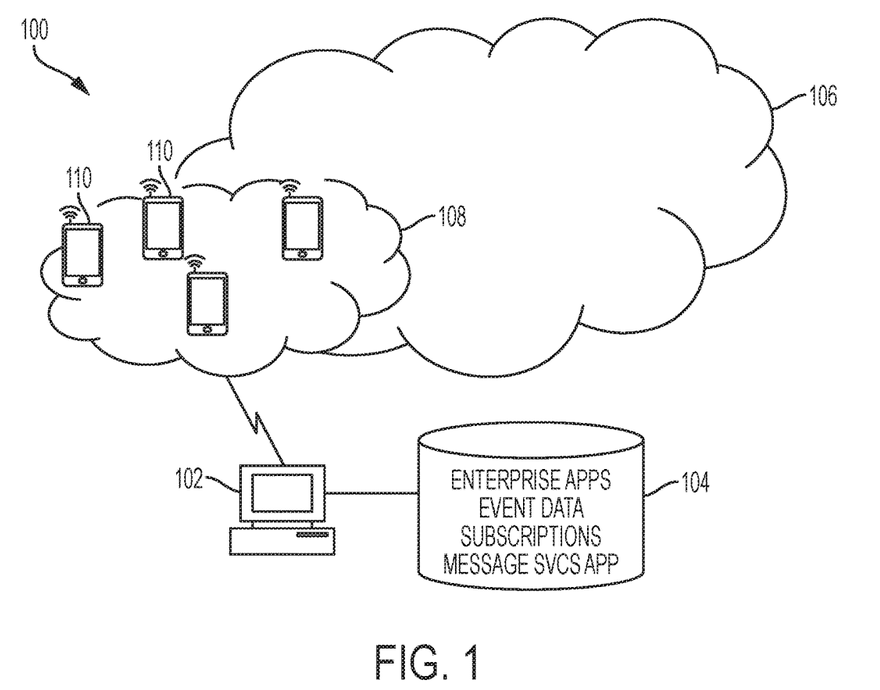
FIG. 1 depicts a system upon which situation-based broadcast message services may be implemented in accordance with an embodiment of the invention.

Turning now to FIG. 1, a system 100 upon which the situation-based broadcast message services may be implemented will now be described in an embodiment. The system 100 includes a host system computer 102, a storage device 104 communicatively coupled to the computer 102, and mobile devices 110, each of which is communicatively coupled to the computer 102 via networks, such as network 106 and network 108. Network 108 refers to a wireless mobile network, while network 106 may be a combination of one or more different types of networks (e.g., local area network, wide area network, Internet, satellite, or terrestrial network, to name a few).

The host system computer 102 may be implemented as a high-speed computer processing device for handling the volume of activities associated with subscribers of the situation-based broadcast message services. In an embodiment, the host system computer 102 may be operated by an entity, such as an enterprise or organization. The entity may provide services to individuals who are present at a location associated with the entity. For example, the entity may be a college university and the individuals present at the campus may include students, students' families, professors, related staff, and miscellaneous guests. The wireless network 108 represents a wireless mobile network provided by the entity at the location or event. Notifications associated with a subscription are broadcast through the wireless network 108, as will be described further herein.

The storage device 104 is communicatively coupled to the host system computer 102. The storage device 104 may be implemented using a variety of devices for storing electronic information. It is understood that the storage device 104 may be implemented using memory contained in the host system computer 102 or it may be a separate physical device, as illustrated in FIG. 1. The storage device 104 may be logically addressable as a consolidated data source across a distributed environment that includes one or ore networks, such as networks 106 and 108. Information stored in the storage device 104 is retrieved and manipulated via the host system computer 102.

The storage device 104 houses applications associated with the entity (e.g., enterprise applications), as well as event-related data associated with events hosted by the entity. The storage device 104 may also store subscription accounts established for visitors or other guests of the entity at a particular venue or for some predefined period of time.

Using the example of a university, a subscription may be defined for a time duration that correlates to the academic year (e.g., from September through May). In addition, or alternatively, the university may define a subscription for a school-related event (e.g., a football game). Thus, in some embodiments, there may be multiple overlapping subscription-based events for which the message services may be implemented.

In an exemplary embodiment, the host system computer 102 executes an application for implementing the message services described herein. For example, the host system 102 may execute a message services application stored in storage device 104, as shown in FIG. 1. In an embodiment, the entity of the host system computer 102 hosts a website through which subscriptions to the message service may be facilitated, as will be described herein. The website may be accessed through one or both of networks 106 and 108 by mobile devices 110 at a venue or location associated with the entity.

The mobile devices 110 may be any portable, wireless communication devices, e.g., cell phone, smart phone, personal digital assistant, and computer tablet, to name a few. The mobile devices 110 implement a web browser application or extension. In an embodiment, other components may be enabled on the mobile devices 110, such as global positioning system components, scanning components, and image capturing components.

In an embodiment, the entity of FIG. 1 establishes settings for implementing the message services through the message services application. For example, the entity may set preferences that define the events for which the message services are offered, as well as subscription registration settings, predefined messages that may be accessed when a condition arises that triggers the sending of a message, as well as other types of settings, as will now be described in FIG. 2.

Figure 2:
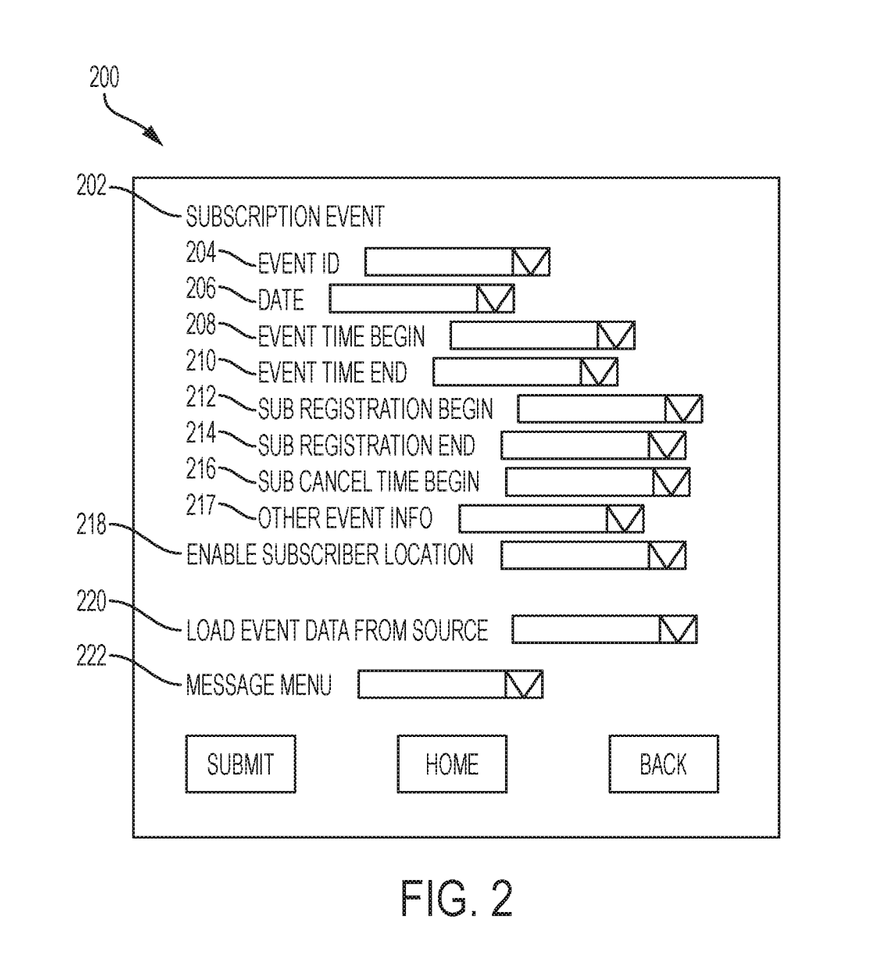
FIG. 2 depicts a user interface screen for establishing subscription settings with respect to an event according to an embodiment.

The message services application provides an administrator or authorized individual with a user interface screen 200, as shown in FIG. 2. Through user interface screen 200, the administrator may select from a list of events 202 hosted by the entity, through option 204. Each event may be identified by a unique identifier and stored in a database, e.g., in storage device 104 of FIG. 1. The administrator may then select the date of the event through option 206. Alternatively, the date of the event may be prepopulated once the event has been selected. The administrator may specify begin and end times of the event via respective options 208 and 210. These times reflect the actual or scheduled begin and end times for the event. While some event end times may not be immediately known (e.g., a baseball game going into double overtime), this end time can be adjusted by the administrator as the event unfolds. That is, the end time can be dynamically adjusted while the event is ongoing.

The subscription registration begin and end times (212 and 214, respectively) reflect a period of time in advance of the event that the mobile devices 110 are able to register for the message services. For example, if a baseball game begin time is 2:00 pm, the subscription registration begin time may be set for 1-2 hours prior to the event begin time to accommodate guests who arrive early at the event. The administrator can configure the subscriptions to be cancelled at a specified time through option 216. Thus, once the selected time has been reached, the subscriber is no longer able to receive messages via the service even though the subscriber remains at the venue or is otherwise still in wireless signal range of the network. It will be understood that in alternative embodiments these times (e.g., in fields 206-216) can be prepopulated by the application once the event identifier has been selected.

In an embodiment, the application is further configured to enable the administrator to input other event information through an option 217. For example, through this option 217, the administrator may provide information such as event name, event banner information, cautionary advice, special needs information—such as seating and wheelchair accessible pathways, as well as more granular information about the venue (e.g., where there are multiple exhibits in different locations around the venue, the application may distinguish and customize messages based on particular aspects of events occurring at different exhibits).

In an embodiment, the application is configured to allow the administrator to enable the receipt of specific subscriber information. This feature is implemented through option 218. In an embodiment, when this feature is enabled, the subscriber is able to transmit more detailed information about his/her location to the application, such that the message service can target certain subscribers who are determined to be immediately impacted by a condition that occurs at the venue. In one embodiment, the application identifies a unique identifier of the mobile device (e.g., UID, MIN, IMEI, MEID, MAC address, etc.). In this embodiment, the application can identify the device 110 through this address. In addition, if the device is enabled with GPS, the application may track the device's location throughout the venue through GPS coordinates. Further, if the subscriber is stationary at the venue, e.g., at an assigned seating, the subscriber may scan his/her ticket including seating assignment or otherwise enter the assignment through the mobile device. In addition to ticket scanning, other information may be provided by the subscriber through the message services subscription. For example, the application may be configured to identify classes of subscribers (e.g., age, special needs, VIP status, etc.).

The application stores this information with the identifying information about the mobile device, along with any special needs or other particular information, which can be used to provide targeted messages based on conditions that occur at the venue. By way of example, if the application determines that the subscriber is seated within a predefined range of a detected unsafe condition, then based on the severity of the condition, the application may be configured to send the message only to those devices within the predefined range of the condition. Alternatively, the messaging application may use the information to prioritize the distribution of the messages (e.g., those subscribers closest to the condition are notified before others, or those closest to an exit may be notified before others). Subscribers with a disability can be provided with customized messages about a wheelchair accessible exit pathway. This feature can provide a significant advantage to existing techniques for notifying individuals of unsafe conditions. For example, an evacuation notification distributed throughout an event over a loud speaker may induce panic and a mob-like exit strategy that can create more harm than the actual condition itself. By prioritizing the distribution of messages, those closest to desired exits may be notified first, followed by those further away from exits in order to promote the safest possible exit strategy.

Turning back to FIG. 2, the application may also be configured to enable the administrator to access event or venue-related data from enterprise applications and databases. By selecting option 220, e.g., the administrator can access event information, such as event calendars (including event descriptions, locations or buildings of the event, event dates, etc.). In addition, other enterprise data, such as seating charts, venue maps, etc., can be accessed through this option 220. In an embodiment, these mappings of data among databases can be implemented at least in part through a database structure as described in FIG. 4. Through this stored information and settings options, the application may be configured to enable an administrator to dynamically mark an electronic map of the event location with an indicator of the location of a condition (see, e.g., FIG. 7, 702). Likewise, the administrator may additionally identify one or more exit routes through which subscribers near the condition may safely exit. The administrator may mark these exit routes on the electronic map as well (see, e.g., FIG. 7, 704).

In an embodiment, the application is further configured to enable the administrator to select pre-configured messages when a condition arises at the venue. This option 222 may include a listing of pre-configured messages. In addition, the option 222 may include a custom feature that enables the administrator to create a unique message that better suits the condition that has been detected at the venue.

Figure 3:
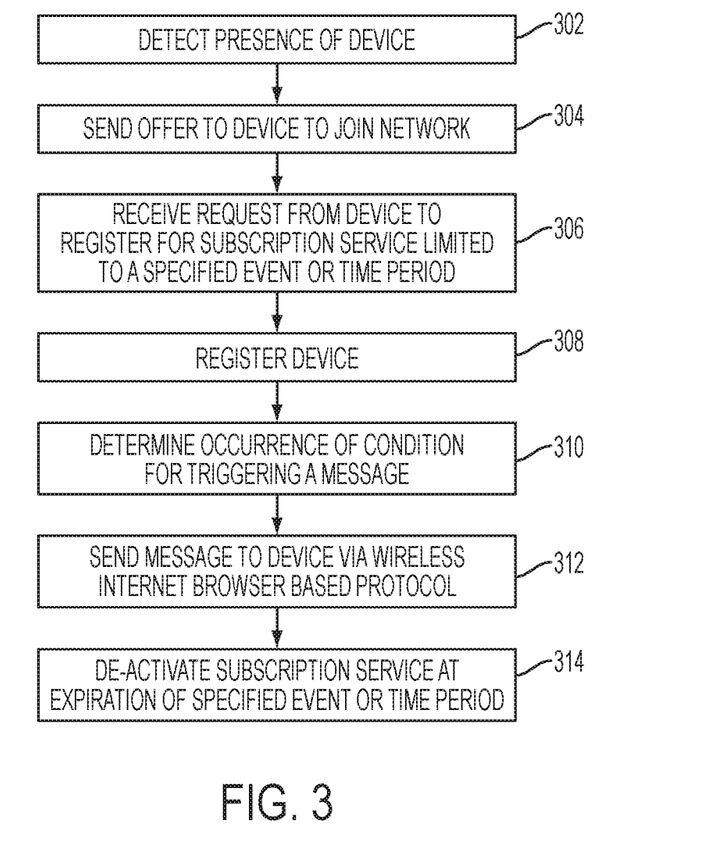
FIG. 3 depicts a flow diagram of a high-level process for implementing situation-based broadcast message services according to an embodiment of the invention.

Turning now to FIG. 3, a high-level process flow is described for implementing message services. The process of FIG. 3 assumes that an administrator or authorized individual has entered and stored settings through the application as described in FIG. 2. In addition, the process assumes that a condition has occurred at an event or venue.

At block 302, the presence of a mobile device 110 at a venue or location of the entity is detected. The presence may be detected from a signal received from the mobile device 110 indicating that it is in wireless range of the entity's wireless network 108.

Figure 5:
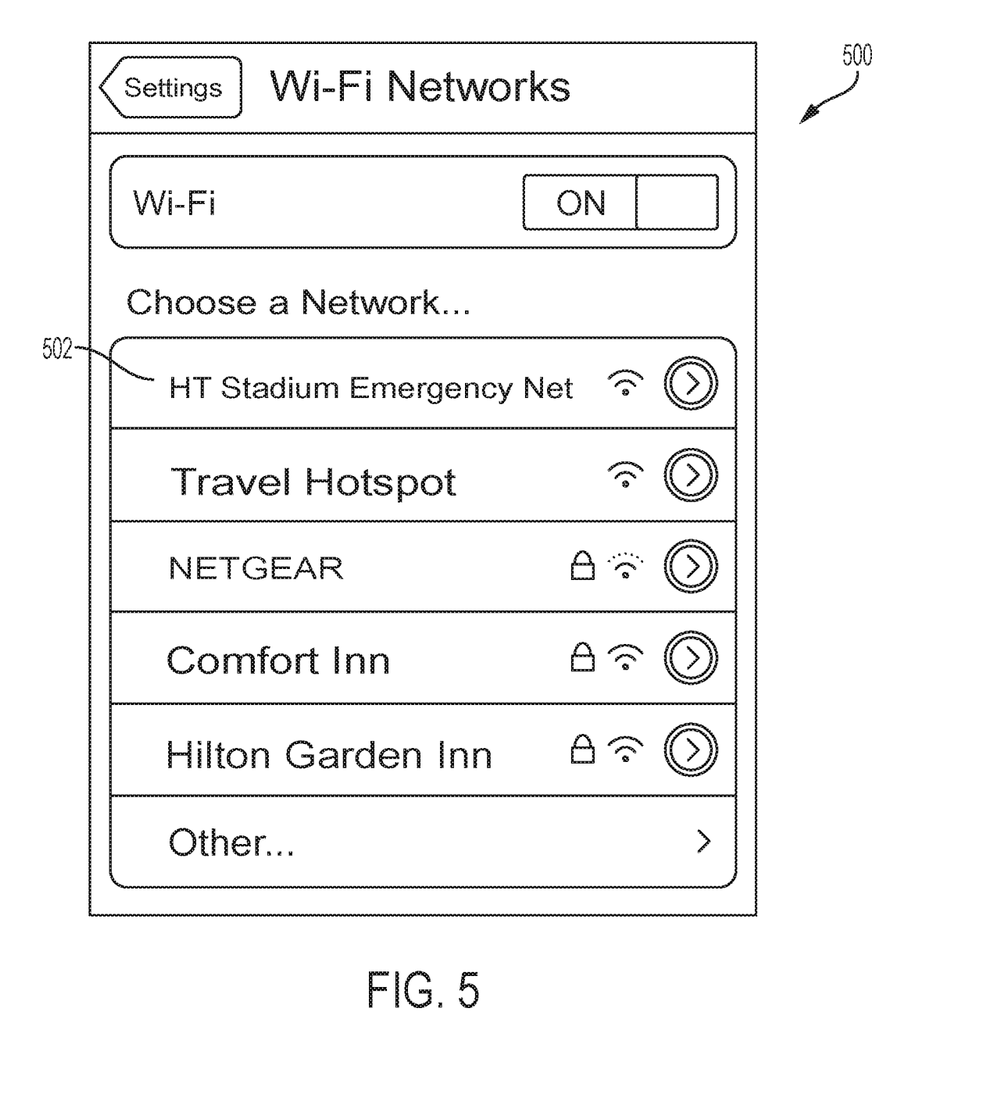
FIG. 5 depicts a user interface screen as seen by a potential subscriber of situation-based broadcast message services according to an embodiment.

At block 304, the message application sends an offer to the mobile device 110 to join the network 108. As shown in FIG. 5, e.g., a user interface screen 500 of an individual's mobile device 110 shows a listing 502 of the entity's wireless network. The individual selects the network listing 502 on the user interface screen 500 and the device's browser is directed to a web page of the entity that accepts subscriptions to the message services that are specifically related to the event as defined by the settings, e.g., in FIG. 2.

Figure 6:
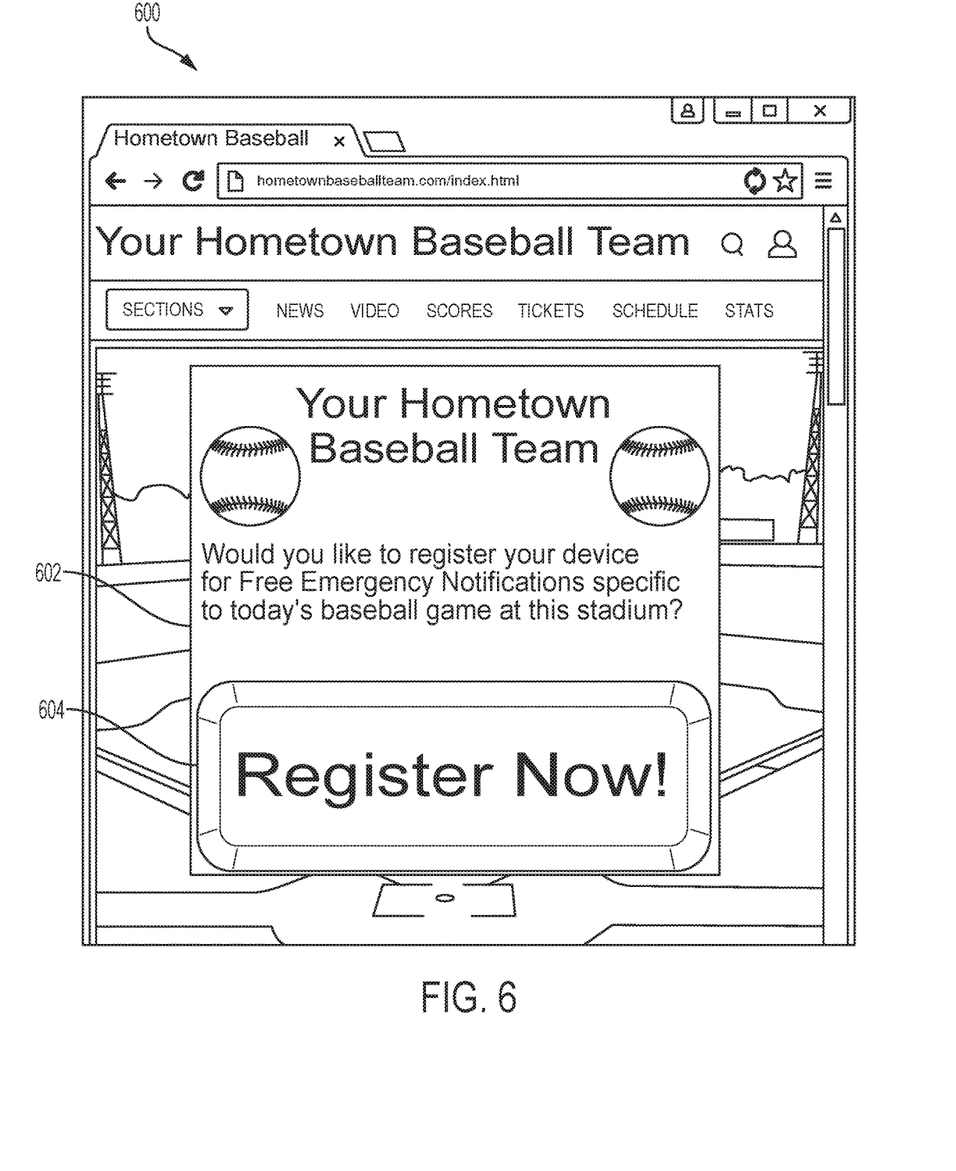
FIG. 6 depicts another user interface screen as seen by a potential subscriber of the situation-based broadcast message services according to an embodiment.

At block 306, the application receives a request from the individual to subscribe to the message services provided through the entity's network 108. The message services are limited to the event or venue at which the mobile device 110 is present. The registration process includes presenting a message through the entity's web page and device browser asking if the individual would like to subscribe. As shown in FIG. 6, a user interface screen 600 illustrates a web page and a registration window 602. The individual can select an option 604 to begin the registration.

At block 308, the application registers the device 110 for the message services. As indicated above, the registration process can include storing an identifier of the mobile device 110 that enables the network 108 to determine that the device 110 has been registered and is subscribed to the service. In other embodiments, if the settings (FIG. 2) enable the additional subscriber location settings, then the subscriber may be prompted to scan or enter ticket information or other location identification information.

At block 310, a condition that triggers the sending of a message is determined. For example, the condition may be a fire, a weather event, an individual whose behavior presents a threat, or other condition that may affect the safety or well-being of the subscribers at the event. At block 312, the application distributes a corresponding message to the subscribing (mobile) devices 110 through the network 108 using a wireless Internet browser based protocol. Based on the location of the condition at the event, as well as the nature, extent, and/or severity of the condition, the application may be configured to selectively distribute the message to devices 110 that are determined to be most impacted by the condition, e.g., based on their location in proximity to the location of the condition. Alternatively, the message may be distributed to all of the subscribing devices 110 at the same time.

Figure 7:
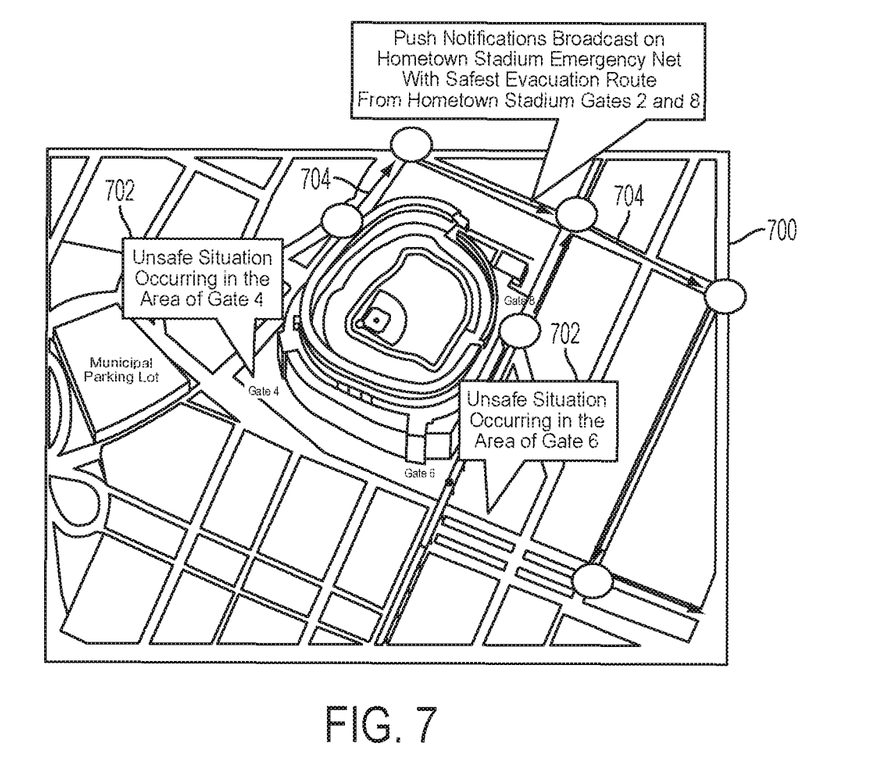
FIG. 7 depicts a user interface screen of a situation-based broadcast message as seen by a subscriber according to an embodiment.

As shown in FIG. 7, a user interface screen 700 on a subscribing mobile device 110 illustrates a map of the venue including an indication of where in the venue an unsafe condition has arisen (702), as well as an exit strategy 704 to safely exit the premises. The exit strategy presented is dynamic in that as conditions change at the event, the exit strategy may need to be evaluated and adjusted. Thus, the message content of the services can be updated throughout the duration of the subscription, which duration is tied to and limited by, the duration of the event.

At block 314, once the event has terminated or the specified time period has elapsed (e.g., the subscription cancel time, or SUB CANCEL TIME BEGIN 216 of FIG. 2 has elapsed, the application de-activates the subscription.

Figure 4:
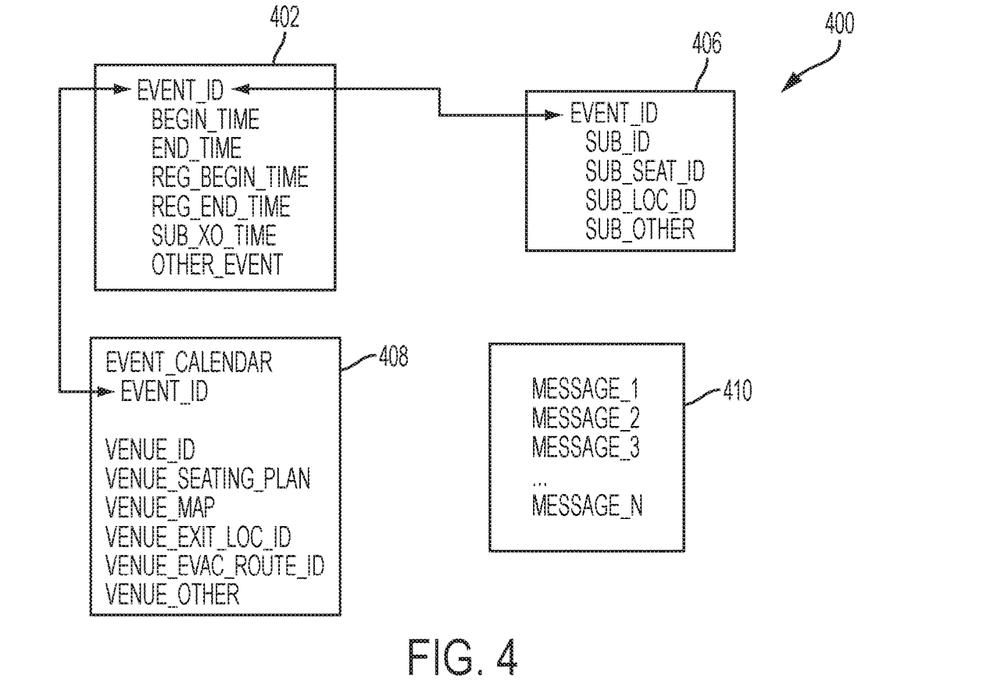
FIG. 4 depicts a database structure for implementing situation-based broadcast message services according to an embodiment.

Turning now to FIG. 4, a set of database structures 400 for facilitating the message services will now be described. In FIG. 4, a structure 402 includes elements that identify and define the subscription parameters for an event or venue. As shown in structure 402, an event ID uniquely identifies the event. Parameters within the structure 402 include its begin time, end time, registration begin and end times, subscription cancellation time, and other event-related metadata. These parameters correspond, respectively, to the fields 204, 206, 208, 210, 212, 214, 216, and 217 of FIG. 2. The event ID (EVENT_ID) may be used as a primary key in the database structures to map to individual databases, as shown in FIG. 4. A structure 406 includes elements that identify the subscriber and the subscriber's location (either by seat ID or other method of location identification, such as GPS coordinates). The subscriber ID reflects an identifier of the mobile device 110, SUB_SEAT_ID reflects a seat assignment, and SUB_LOC_ID may be used to store the subscriber's current location (e.g., through GPS). In addition, SUB_OTHER may be used to store other information about the subscriber, such as special needs, VIP status, etc. The elements in structure 406 substantially correlate to the option 218 in FIG. 2. Thus, in an embodiment, the information entered through option 218 is processed and stored through the structure 406. As shown in FIG. 4, the EVENT_ID of structure 402, as a primary key, maps to the EVENT_ID of structure 406.

A structure 408 includes elements that may be accessed from an enterprise application of the entity that describes its events (e.g., event calendar including metadata for event details, dates, times, etc.), venues, seating plans, and maps, each of which may include metadata for exits, exit routes, landmark locations at the venue, etc. Other metadata not listed in the structure 408 may be captured through VENUE_OTHER. The elements in structure 408 substantially correspond to the option 220 of FIG. 2. This information can be linked to the structure 402 through the EVENT_ID key.

Structure 410 may include a database of pre-configured messages that can be accessed in the event of a condition. For example, messages can be directed to specific types of conditions, such as weather, fire, etc. A sample message may include content that indicates a thunderstorm is imminent and guests should seek shelter at various locations around the event. As these locations may remain unchanged over time (e.g., a covered pavilion), a predefined message may be appropriate for storage and retrieval as needed. The application can be configured to access messages that are stored with identifying descriptive information for easy retrieval. The structure 410 substantially corresponds to the option 222 of FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computer processor, a sign up request from a first mobile device for a message service with respect to an event at which the first mobile device is present, the message service configured to distribute messages spanning a time period that corresponds to the event;
   determining, during the time period, that a condition has occurred for triggering a message;
   determining that a location of the condition is within a specified range of a location of the first mobile device;
   determining that the location of the condition is outside of the specified range of a location of a second mobile device present at the event;
   sending the message to the first mobile device during the time period using a wireless internet browser based protocol, wherein the message is transmitted over a wireless network;
   sending the message to the second mobile device after sending the message to the first mobile device based at least in part on the location of the condition being within the specified range of the location of the first mobile device and outside of the specified range of the location of the second mobile device; and
   cancelling the message service at the expiration of the time period.

2. The method of claim 1, wherein the time period is defined by beginning and end times of the event.

3. The method of claim 1, further comprising providing a user interface with options for receiving settings for the message service; and
   receiving, via the options:
   beginning and end times of the event,
   beginning and end times of a registration period for registering the first mobile device; and
   a cancellation time for de-activating the message service.

4. The method of claim 3, wherein the options further include an option to customize the message based at least in part on one or more characteristics of the condition.

5. The method of claim 3, wherein the options further include an option to customize the message based at least in part on one or more characteristics of the condition and based at least in part on identified needs of a subscriber of the message service.

6. The method of claim 1, further comprising:
   receiving seating assignment information from the first mobile device; and
   determining the location of the first mobile device based at least in part on the seating assignment information.

7. The method of claim 1, further comprising:
   receiving a unique identifier of the first mobile device;
   tracking movement of the first mobile device at the event via the unique identifier; and
   determining the location of the first mobile device based at least in part on the tracking.

8. The method of claim 1, further comprising:
   marking an indication of the location of the condition on an electronic map of the event;
   determining an exit pathway that guides the first mobile device away from the condition; and
   marking an indication of the exit pathway on the electronic map;
   wherein transmitting the message to the first mobile device includes transmitting the electronic map to the first mobile device.

9. A system, comprising:
   a memory having computer readable instructions; and
   a processor for executing the computer readable instructions, the computer readable instructions including instructions for:
   receiving a sign up request from a first mobile device for a message service with respect to an event at which the first mobile device is present, the message service configured to distribute messages spanning a time period that corresponds to the event;
   determining, during the time period, that a condition has occurred for triggering a message;
   determining that a location of the condition is within a specified range of a location of the first mobile device;
   determining that the location of the condition is outside of the specified range of a location of a second mobile device present at the event;
   sending the message to the first mobile device during the time period using a wireless internet browser based protocol, wherein the message is transmitted over a wireless network;
   sending the message to the second mobile device after sending the message to the first mobile device based at least in part on the location of the condition being within the specified range of the location of the first mobile device and outside of the specified range of the location of the second mobile device, and
   cancelling the message service at the expiration of the time period.

10. The system of claim 9, wherein the time period is defined by beginning and end times of the event.

11. The system of claim 9, wherein the computer readable instructions further comprise instructions for providing a user interface with options for receiving settings for the message service; and
    receiving, via the options:
    beginning and end times of the event;
    beginning and end times of a registration period for registering the first mobile device; and
    a cancellation time for de-activating the message service.

12. The system of claim 11, wherein the options further include an option to customize the message based at least in part on one or more characteristics of the condition.

13. The system of claim 11, wherein the options further include an option to customize the message based at least in part on one or more characteristics of the condition and based at least in part on identified needs of a subscriber of the message service.

14. The system of claim 9, wherein the computer readable instructions further comprise:
    receiving seating assignment information from the first mobile device; and
    determining the location of the first mobile device based at least in part on the seating assignment information.

15. The system of claim 9, wherein the computer readable instructions further comprise instructions for:
- receiving a unique identifier of the first mobile device;
- tracking movement of the first mobile device at the event via the unique identifier; and
- determining the location of the first mobile device based at least in part on the tracking.

16. The system of claim 9, wherein the computer readable instructions further comprise instructions for:
- marking an indication of the location of the condition on an electronic map of the event;
- determining an exit pathway that guides the first mobile device away from the condition; and
- marking an indication of the exit pathway on the electronic map;
- wherein transmitting the message to the first mobile device includes transmitting the electronic map to the first mobile device.

17. A computer program product comprising a non-transitory computer readable storage medium having program instructions embodied therewith, wherein the computer readable storage medium is not a transitory signal per se, the program instructions executable by a computer processor to cause the computer processor to perform a method comprising:
- receiving, by a computer processor, a sign up request from a first mobile device for a message service with respect to an event at which the first mobile device is present, the message service configured to distribute messages spanning a time period that corresponds to the event;
- determining, during the time period, that a condition has occurred for triggering a message;
- determining that a location of the condition is within a specified range of a location of the first mobile device;
- determining that the location of the condition is outside of the specified range of a location of a second mobile device present at the event;
- sending the message to the first mobile device during the time period using a wireless internet browser based protocol, wherein the message is transmitted over a wireless network;
- sending the message to the second mobile device after sending the message to the first mobile device based at least in part on the location of the condition being within the specified range of the location of the first mobile device and outside of the specified range of the location of the second mobile device, and
- cancelling the message service at the expiration of the time period.

18. The computer program product of claim 17, wherein the time period is defined by beginning and end times of the event.

19. The method of claim 1, further comprising:
- determining that the sign-in request comprises an indication of a disability of a user of the first mobile device;
- determining an exit pathway that accommodates the disability, wherein the exit pathway guides the user of the first mobile device away from the location of the condition towards an exit of a venue associated with the event; and
- customizing the message sent to the first mobile device to include an indication of the exit pathway.

20. The method of claim 1, further comprising:
- determining a location of a third mobile device;
- determining that the location of the first mobile device is closer to a location of an exit of a venue associated with the event than the location of the third mobile device; and
- transmitting the message to the third mobile device after transmitting the message to the first mobile device.

* * * * *